(12) United States Patent
Tateo et al.

(10) Patent No.: US 10,494,499 B2
(45) Date of Patent: Dec. 3, 2019

(54) CROSSLINKED POLYOLEFIN-BASED RESIN FOAM SHEET AND PROCESS FOR PRODUCING THE SAME AS WELL AS ADHESIVE TAPE

(71) Applicants: Eiji Tateo, Saitama (JP); Koji Shiraishi, Saitama (JP); Sekisui Chemical Co., Ltd., Osaka (JP)

(72) Inventors: Eiji Tateo, Saitama (JP); Koji Shiraishi, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 13/868,414

(22) Filed: Apr. 23, 2013

(65) Prior Publication Data

US 2013/0235514 A1 Sep. 12, 2013

Related U.S. Application Data

(62) Division of application No. 11/976,548, filed on Oct. 25, 2007, now abandoned, which is a division of
(Continued)

(30) Foreign Application Priority Data

Jul. 16, 2003 (JP) .................................. 2003-275595

(51) Int. Cl.
*C08J 9/10* (2006.01)

(52) U.S. Cl.
CPC ..... *C08J 9/103* (2013.01); *Y10T 428/249953* (2015.04); *Y10T 428/268* (2015.01)

(58) Field of Classification Search
CPC ....................................................... C08J 3/00
(Continued)

(56) References Cited

U.S. PATENT DOCUMENTS 3,384,531 A 5/1968 Parrish
3,893,957 A 7/1975 Mixon et al.
(Continued)

FOREIGN PATENT DOCUMENTS

JP 60-130627 7/1985
JP 3-62832 3/1991
(Continued)

OTHER PUBLICATIONS

Abstract of JP 8-239632, see IDS filed Apr. 23, 2013 for date and inventor.*
(Continued)

*Primary Examiner* — Victor S Chang
(74) *Attorney, Agent, or Firm* — Wenderoth, Lind & Ponack, L.L.P.

(57) ABSTRACT

The present invention provides a crosslinked polyolefin-based resin-extruded foam sheet capable of reducing its thickness while retaining excellent flexibility and heat resistance. The crosslinked polyolefin-based resin foam sheet of the present invention is obtained by feeding a polyolefin-based resin and a thermally degradable blowing agent to an extruder, melting and kneading them, extruding the kneaded material through the extruder into a sheet to form an expandable polyolefin-based resin sheet, and expanding the sheet. Herein, a degree of crosslinking of the crosslinked polyolefin-based resin foam sheet is 5 to 60% by weight, an aspect ratio of a cell (MD average cell diameter/CD average cell diameter) is 0.25 to 1, and the polyolefin-based resin contains 40% by weight or more of a polyethylene-based resin obtained using a metallocene compound containing a tetravalent transition metal as a polymerization catalyst.

3 Claims, 1 Drawing Sheet

Related U.S. Application Data application No. 10/549,161, filed as application No. PCT/JP2004/010217 on Jul. 16, 2004, now abandoned.

(58) Field of Classification Search
USPC ............... 428/304.4, 318.4, 314.2, 343
See application file for complete search history.

(56) References Cited

U.S. PATENT DOCUMENTS

| | | | | |
|---|---|---|---|---|
| 4,272,468 | A | * | 6/1981 | Slocumb .................. 264/53 |
| 5,176,953 | A | | 1/1993 | Jacoby et al. |
| 5,784,054 | A | * | 7/1998 | Armstrong et al. ......... 345/177 |
| 6,197,841 | B1 | * | 3/2001 | Takimoto et al. ............ 521/144 |
| 6,319,961 | B1 | * | 11/2001 | Takahashi .................. 521/143 |
| 6,340,717 | B1 | | 1/2002 | Hargarten et al. |
| 2004/0122120 | A1 | * | 6/2004 | Tateo .................. C08J 9/0061 521/143 |

FOREIGN PATENT DOCUMENTS

| | | |
|---|---|---|
| JP | 5-070623 | 3/1993 |
| JP | 8-239632 | 9/1996 |
| JP | 10-070973 | 3/1998 |
| JP | 10070973 | 3/1998 |
| JP | 2001-098099 | 4/2001 |
| JP | 2001-098101 | 4/2001 |
| JP | 2002-317548 | 10/2002 |
| JP | 2003-209078 | 7/2003 |
| JP | 2004-323842 | 11/2004 |
| WO | 00/15697 | 3/2000 |

OTHER PUBLICATIONS

Translation of JP 8-239632, see IDS filed Apr. 23, 2013 for date and inventor.*
Machine translation of JP 10-070973, see above for date and inventor.
Office Action issued in corresponding Japanese Patent Application No. 2005-511866 dated Jun. 3, 2009 (in Japanese language).
Supplementary European Search Report dated Sep. 9, 2010 in corresponding European Patent Application No. 04747682.5-2102.

* cited by examiner

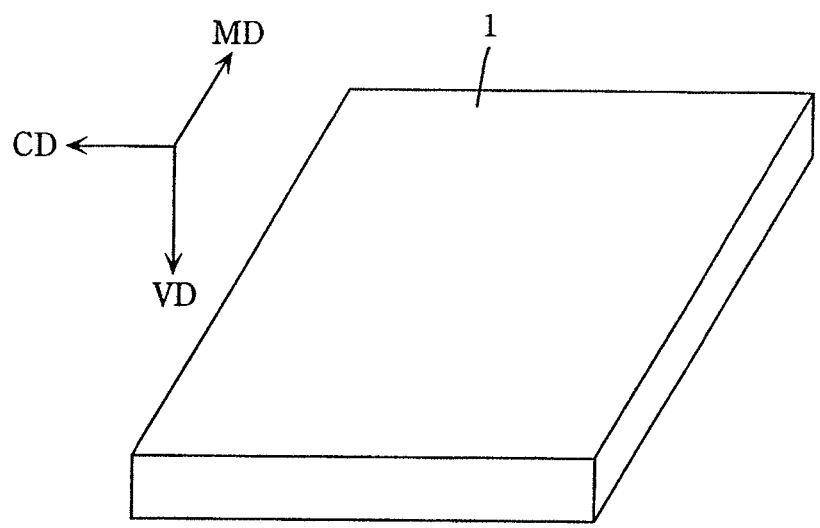

CROSSLINKED POLYOLEFIN-BASED RESIN FOAM SHEET AND PROCESS FOR PRODUCING THE SAME AS WELL AS ADHESIVE TAPE

TECHNICAL FIELD

The present invention relates to a crosslinked polyolefin-based resin foam sheet having excellent flexibility and heat resistance and a process for producing the same, as well as an adhesive tape using the crosslinked polyolefin-based resin foam sheet.

BACKGROUND ART

Conventionally, polyolefin-based resin foam sheets have been used in a wide range of utility, and examples of this utility may include sealing materials for electronic appliances in addition to a base material of an adhesive tape and a base material of a patch. In these utilities, a polyolefin-based resin foam sheet is required to have a reduced thickness, and flexibility.

As such a polyolefin-based resin foam sheet, Patent Document 1 has proposed a porous sheet with flexibility and mechanical strength improved by adding an inorganic filler to a polyolefin-based resin to form a sheet, and stretching this sheet to render it porous.

However, since it is difficult to realize a high expansion ratio of the porous sheet, the sheet has insufficient flexibility. Further, since the porous sheet has not been subjected to crosslinking treatment, stretching treatment can not be performed at a melting point or more of a polyolefin-based resin constituting a porous sheet; therefore, there is a problem that distortion is occurred in the porous sheet during stretching treatment, and the porous sheet is shrunk during use.

In addition, as a polyolefin-based resin foam sheet, Patent Document 2 has proposed a crosslinked ethylene-based resin foam which comprises a super density polyethylene resin having a predetermined density and a foaming agent, and is obtained by expanding a sheet which has been irradiated with an electron beam of 1 Mrad or less.

However, the crosslinked ethylene-based resin foam has insufficient flexibility and heat resistance. It is considered that the flexibility is improved by increasing an expansion ratio, but there is a problem that when the expansion ratio is increased, the resulting foam is thick.

Patent Document 1: JP-B 7-64942
Patent Document 2: JP-B 6-76505

DISCLOSURE OF THE INVENTION

Problems to be Solved by the Invention

The present invention provides a crosslinked polyolefin-based resin foam sheet capable of reducing its thickness while retaining excellent flexibility and heat resistance, a process for producing the same, as well as an adhesive tape using the crosslinked polyolefin-based resin foam sheet.

Means for Solving the Problems

The crosslinked polyolefin-based resin foam sheet of the present invention is a crosslinked polyolefin-based resin foam sheet obtained by feeding a polyolefin-based resin and a thermally degradable blowing agent to an extruder, melting and kneading them, extruding it through an extruder into a sheet to form an expandable polyolefin-based resin sheet, and expanding the sheet, wherein a degree of crosslinking of the crosslinked polyolefin-based resin foam sheet is 5 to 60% by weight, an aspect ratio of a cell is within a predetermined range, and the polyolefin-based resin contains 40% by weight or more of a polyethylene-based resin obtained using a metallocene compound containing a tetravalent transition metal as a polymerization catalyst.

The polyolefin-based resin constituting the crosslinked polyolefin-based resin foam sheet is not particularly limited as far as it contains 40% by weight or more of a polyethylene-based resin obtained using a metallocene compound containing a tetravalent transition metal as a polymerization catalyst, and may be only a polyethylene-based resin obtained using a metallocene compound containing a tetravalent transition metal as a polymerization catalyst, or a resin consisting of a polyethylene-based resin obtained using a metallocene compound containing a tetravalent transition metal as a polymerization catalyst, and another polyolefin-based resin.

In the polyolefin-based resin, the content of the polyethylene-based resin obtained using a metallocene compound containing a tetravalent transition metal as a polymerization catalyst is limited to 40% by weight or more, preferably 50% by weight or more, more preferably 60% by weight or more, particularly preferably 100% by weight. Herein, 100% by weight of the content of the polyethylene-based resin obtained using a metallocene compound means a case where only the polyethylene-based resin obtained using a metallocene compound is used as the polyolefin-based resin.

The reasons why the content of the polyolefin-based resin obtained using a metallocene compound in the polyolefin-based resin is limited to 40% by weight or more will be explained. The first reason is as follows.

A crosslinked polyolefin-based resin foam sheet is produced by stretching a foam sheet in a predetermined direction while expanding or heating as described later. Upon stretching of this foam sheet, cells of the foam sheet are stretched in a stretching direction, and cell walls are brought into close to each other. Therefore, when a resin having adherability (e.g., ethylene-vinyl acetate copolymer) is used as a polyolefin-based resin, cell walls are adhered and incorporated, and an aspect ratio of a cell in a predetermined range can not be obtained. On the other hand, the crosslinked polyolefin-based resin foam sheet of the present invention is required to have flexibility.

Thus, by using the polyolefin-based resin containing 40% by weight or more of the polyethylene-based resin obtained using a metallocene compound, flexibility is imparted to the polyolefin-based resin without increasing adherability, and an aspect ratio of a cell of the crosslinked polyolefin-based resin foam sheet is set within a predetermined range, thereby improving a mechanical strength and rendering flexibility excellent.

The second reason is as follows. The polyethylene-based resin obtained using a metallocene compound has a narrow molecular weight distribution and, in the case of a copolymer, a copolymer component is introduced in any molecular weight component at an approximately equal ratio. Therefore, a foam sheet can be evenly crosslinked. Further, since a foam sheet is evenly crosslinked, the foam sheet can be evenly stretched, and a thickness of the resulting crosslinked polyolefin-based resin foam sheet can be totally even.

As the polyethylene-based resin obtained using a metallocene compound containing a tetravalent transition metal as a polymerization catalyst, a linear low density polyethylene obtained by copolymerizing ethylene and a small amount of α-olefin using a metallocene compound containing a tetravalent transition metal as a polymerization catalyst is preferable.

Examples of the α-olefin may include propylene, 1-butene, 1-pentene, 4-methyl-1-pentene, 1-hexene, 1-heptene, 1-octene and the like.

The metallocene compound generally refers to a compound having a structure in which a transition metal is held by π electron system unsaturated compounds, a representative of which is a bis(cyclopentadienyl)metal complex.

Specific examples of the metallocene compound containing a tetravalent transition metal in the present invention may include compounds in which one or two or more cyclopentadienyl rings or analogues thereof are present as a ligand for a tetravalent transition metal such as titanium, zirconium, nickel, palladium, hafnium and platinum.

Examples of the ligand may include a cyclopentadienyl ring; a cyclopentadienyl ring substituted with a hydrocarbon group, a substituted hydrocarbon group or a hydrocarbon-substituted metalloid group; a cyclopentadienyloligomer ring; an indenyl ring; an indenyl ring substituted with a hydrocarbon group, a substituted hydrocarbon group or a hydrocarbon-substituted metalloid group, and the like. In addition to these π electron system unsaturated compounds, as a ligand, a monovalent anion ligand such as chlorine and bromine or a divalent anion chelate ligand, hydrocarbon, alkoxide, arylamide, aryloxide, amide arylamide, phosphide, and arylphosphide may be coordination-bonded to a transition metal atom.

Further, examples of a hydrocarbon group substituting at a cyclopentadienyl ring may include a methyl group, an ethyl group, a propyl group, a butyl group, an isobutyl group, an amyl group, an isoamyl group, a hexyl group, a 2-ethylhexyl group, a heptyl group, an octyl group, a nonyl group, a decyl group, a cetyl group, a phenyl group and the like.

Examples of such a metallocene compound containing a tetravalent transition metal may include cyclopentadienyltitaniumtris(dimethylamide), methylcyclopentadienyltitaniumtris(dimethylamide), bis(cyclopentadienyl)titanium dichloride, dimethylsilyltetramethylcyclopentadienyl-t-butylamidezirconium dichloride, dimethylsilyltetramethylcyclopentadienyl-t-butylamidohafnium dichloride, dimethylsilyltetramethylcyclopentadienyl-p-n-butylphenylamide zirconium chloride, methylphenylsilyltetramethylcyclopentadienyl-t-butylamidehafnium dichloride, indenyltitaniumtris(dimethylamide), indenyltitaniumtris(diethylamide), indenyltitaniumtris(di-n-propylamide), indenyltitaniumbis(di-n-butylamide)(di-n-propylamide), and the like.

The metallocene compound exerts action as a catalyst upon polymerization of various olefins by changing a kind of a metal and a structure of a ligand, and combining with a particular cocatalyst (promoter). Specifically, polymerization is usually performed in a catalyst system in which methylaluminoxane (MAO), a boron-based compound or the like is added as a cocatalyst to these metallocene compounds. A ratio of a cocatalyst to be used relative to the metallocene compound is preferably 10 to 1,000,000 molar times, more preferably 50 to 5,000 molar times.

A method of polymerizing the polyethylene-based resin is not particularly limited, and examples thereof may include a solution polymerization method using an inert medium, a bulk polymerization method substantially free of an inert medium, a vapor phase polymerization method and the like. A polymerization temperature is usually −100° C. to 300° C., and a polymerization pressure is usually a normal pressure to 100 kg/cm$^2$.

In the metallocene compound, active points are even in property and have the same active degree; therefore, evenness in a molecular weight, a molecular weight distribution, a composition, a composition distribution and the like of a polymer to be synthesized is enhanced. Therefore, a polyolefin-based resin polymerized using these metallocene compounds as a polymerization catalyst has a narrow molecular weight distribution and, in the case of a copolymer, the resin has a characteristic that a copolymerization component is introduced in any molecular weight component at an approximately equal ratio.

Further, examples of a polyolefin-based resin other than a polyethylene-based resin obtained using a metallocene compound containing a tetravalent transition metal as a polymerization catalyst may include a polyethylene-based resin, a polypropylene-based resin and the like.

The polyethylene-based resin is not particularly limited as far as it is not a polyethylene-based resin obtained using a metallocene compound containing a tetravalent transition metal as a polymerization catalyst, and examples thereof may include linear low density polyethylene, low density polyethylene, intermediate density polyethylene, high density polyethylene, ethylene-α-olefin copolymer containing 50% by weight or more of ethylene, ethylene-vinyl acetate copolymer containing 50% by weight or more of ethylene, and the like. These may be used alone, or two or more of them may be used in combination. Examples of α-olefin constituting the ethylene-α-olefin-copolymer may include propylene, 1-butene, 1-pentene, 4-methyl-1-pentene, 1-hexene, 1-heptene, 1-octene and the like.

Examples of the polypropylene-based resin may include polypropylene, a propylene-α-olefin copolymer containing 50% by weight of propylene, and the like. These may be used alone, or two or more of them may be used in combination. Examples of α-olefin constituting a propylene-α-olefin copolymer may include ethylene, 1-butene, 1-pentene, 4-methyl-1-pentene, 1-hexene, 1-heptene, 1-octene and the like.

If a degree of crosslinking of the crosslinked polyolefin-based resin foam sheet is small, upon stretching of a foam sheet, a cell at a portion in the vicinity of a surface of the foam sheet is broken, the surface is roughened, and appearance of the resulting crosslinked polyolefin-based resin foam sheet is reduced. On the other hand, if the degree of crosslinking is large, a melt viscosity of an expandable polyolefin-based resin composition becomes too high, upon heating the expandable polyolefin-based resin composition to foam it, the expandable polyolefin-based resin composition becomes difficult to follow expansion, and a crosslinked polyolefin-based resin foam sheet having a desired expansion ratio can not be obtained. Therefore, the degree of crosslinking is limited to 5 to 60% by weight, preferably 10 to 40% by weight.

The degree of crosslinking of the crosslinked polyolefin-based resin foam sheet refers to a degree of crosslinking measured by the following manner. About 100 mg of a test piece is taken from a crosslinked polyolefin-based resin foam sheet, and a weight A (mg) of the test piece is weighed precisely. Then, this test piece is immersed in 30 cm$^3$ of xylene at 120° C., allowed to stand for 24 hours, filtered with a 200 mesh wire gauze to take insolubles on the wire gauze, which is dried in vacuum, and weight B (mg) of the insolubles is weighed precisely. From the resulting value, a degree of crosslinking (% by weight) is calculated from the following equation.

$$\text{Degree of crosslinking}(\% \text{ by weight}) = 100 \times (B/A)$$

Further, the crosslinked polyolefin-based resin foam sheet is required that an aspect ratio of a cell (MD average cell diameter/CD average cell diameter) is 0.25 to 1, or an aspect ratio of a cell (CD average cell diameter/VD average cell diameter) is 2 to 18, and it is preferable that an aspect ratio of a cell (MD average cell diameter/CD average cell diameter) is 0.25 to 1, and an aspect ratio of a cell (CD average cell diameter/VD average cell diameter) is 2 to 18.

More specifically, if a ratio of a MD average cell diameter and a CD average cell diameter in the crosslinked polyolefin-based resin foam sheet, that is, an aspect ratio of a cell (MD average cell diameter/CD average cell diameter) is small, an expansion ratio is reduced so that flexibility is reduced, or a variation in a thickness, flexibility and a tensile strength of the crosslinked polyolefin-based resin foam sheet is occurred in some cases. On the other hand, if the ratio is large, flexibility of the crosslinked polyolefin-based resin foam sheet is reduced. Therefore, the ratio is preferably 0.25 to 1, more preferably 0.25 to 0.60.

In addition, if a ratio of a CD average cell diameter and a VD average cell diameter in the crosslinked polyolefin-based resin foam sheet, that is, an aspect ratio of a cell (CD average cell diameter/VD average cell diameter) is small, flexibility of the crosslinked polyolefin-based resin foam sheet is reduced. On the other hand, if the ratio is large, an expansion ratio is reduced so that flexibility is reduced, or a variation in a thickness, flexibility and a tensile strength of the crosslinked polyolefin-based resin foam sheet is occurred in some cases. Therefore, the ratio is preferably 2 to 18, more preferably 2.5 to 15.

Herein, as shown in FIG. 1, MD (Machine Direction) of a crosslinked polyolefin-based resin foam sheet 1 refers to an extrusion direction, CD (Crossing Direction) of the crosslinked polyolefin-resin foam sheet 1 refers to a direction orthogonal to the MD (Machine Direction) and along with a surface of the crosslinked polyolefin-based resin foam sheet 1, and VD (Vertical (thickness) Direction) of the crosslinked polyolefin-based resin foam sheet 1 refers to a direction orthogonal to the surface of the crosslinked polyolefin-based resin foam sheet 1.

Next, a MD average cell diameter of the crosslinked polyolefin-based resin foam sheet refers to a diameter measured by the following manner: a crosslinked polyolefin-based resin foam sheet is cut with a plane parallel with VD at an approximately central part in its CD over a full length.

Thereafter, a cut section of the crosslinked polyolefin-based resin foam sheet is magnified 60 times using a scanning electron microscope (SEM), and a photograph is taken so that a full length of VD of the crosslinked polyolefin-based resin foam sheet is contained.

A straight line which is 15 cm in a length on the resulting photograph (actual length is 2500 μm before magnification) is drawn on a part corresponding to a central part of VD of the crosslinked polyolefin-based resin foam sheet so that it is parallel with a surface of the crosslinked polyolefin-based resin foam sheet.

Then, the number of cells positioned on the straight line is counted with naked eyes, and a MD average cell diameter of a cell is calculated based on the following equation.

MD average cell diameter (μm)=2500 (μm)/cell number

A VD average cell diameter of the crosslinked polyolefin-based resin foam sheet refers to a diameter measured by the following manner: a photograph is taken by the same manner as the manner upon calculation of the MD average cell diameter of the crosslinked polyolefin-based resin foam sheet.

In the resulting photograph, three straight lines dividing a cut section of the photographed crosslinked polyolefin-based resin foam sheet into four in MD are drawn in a direction orthogonal to a surface of the crosslinked polyolefin-based resin foam sheet (VD) over a full length of a foam sheet.

Thereafter, a length of each straight line is measured and, at the same time, the number of cells positioned on each straight line is counted with naked eyes, a VD average cell diameter of a cell is calculated for each straight line based on the following equation, and an arithmetic mean thereof is regarded as a VD average cell diameter of a cell.

VD average cell diameter(μm)=length of straight line on photograph(μm)/(60×cell number)

Next, a CD average cell diameter of the crosslinked polyolefin-based resin foam sheet refers to a diameter measured by the following manner: the crosslinked polyolefin-based resin foam sheet is cut with a plane parallel with its CD and a direction orthogonal to a surface of the crosslinked polyolefin-based resin foam sheet (VD) over a full length in a thickness direction.

Thereafter, a cut section of the crosslinked polyolefin-based resin foam sheet is magnified 60 times using a scanning electron microscope (SEM), and a photograph is taken so that a full length in a thickness direction of the crosslinked polyolefin-based resin foam sheet is contained.

Based on the resulting photograph, a CD average cell diameter is calculated by the same manner as that upon measurement of the MD average cell diameter of the crosslinked polyolefin-based resin foam sheet.

Upon counting of the number of cells positioned on a straight line in the manner for measuring the aforementioned average cell diameter, a cell diameter is determined based only on a cell cross section appearing on the photograph.

That is, there is a case where although cells appear completely separated by a cell wall on the cut section of the crosslinked polyolefin-based resin foam sheet, they are communicated at a portion other than the cut section of the crosslinked polyolefin-based resin foam sheet. However, in the present invention, whether they are communicated or not at the portion other than the cut section of the crosslinked polyolefin-based resin foam sheet is not taken into consideration, a cell morphology is determined based only on a cross section of a cell appearing on the photograph, and one cavity portion completely surrounded by the cross section of the cell membrane appearing on the photograph is determined as one cell.

Positioning on a straight line refers to a case where the straight line is completely penetrated at an arbitrary portion of the cell. In addition, at both ends of the straight line, in the case where an end of the straight line is situated in a cell without complete penetration of a straight line through a cell, this cell was counted as 0.5.

Upon photographing of the cut section of the crosslinked polyolefin-based resin foam sheet, when the cut section of the crosslinked polyolefin-based resin foam sheet is colored, discrimination of a cell becomes easy and, at the same time, when a scale of 2500 μM is magnified simultaneously and is photographed, it becomes easy to specify a length of the straight line on the photograph.

In addition, if a 25% compression strength according to JIS K6767 of the crosslinked polyolefin-based resin foam sheet is large, feeling of the crosslinked polyolefin-based resin foam sheet is lowered, or impact absorbability is reduced in some cases. Therefore, $4.9 \times 10^4$ Pa or less is preferable. If the strength is too small, upon binding of the crosslinked polyolefin-based resin foam sheet, the sheet is crushed in a thickness direction, and a thickness is reduced in some cases. Therefore, $2 \times 10^4$ to $4 \times 10^4$ Pa is more preferable.

Further, if a tensile strength at 23° C. in at least one direction of MD and CD in the crosslinked polyolefin-based resin foam sheet is small, when a crosslinked polyolefin-based resin foam sheet is used as a base material of an adhesive tape, there is a possibility that the crosslinked polyolefin-based resin foam sheet is cut during use. Therefore, $1.96 \times 10^6$ Pa or more is preferable. If the strength is too large, when the crosslinked polyolefin-based resin foam sheet is used as a base material of an adhesive tape, there is a possibility that it becomes difficult to manually cut the adhesive tape, and handleability is reduced. Therefore, $2.2 \times 10^6$ to $8.0 \times 10^6$ Pa is more preferable.

A tensile strength at 23° C. in MD or CD of the crosslinked polyolefin-based resin foam sheet refers to a strength measured according to JIS K6767.

In addition, if a thermal dimensional change rate at 90° C. of the crosslinked polyolefin-based resin foam sheet is small, when the crosslinked polyolefin-based resin foam sheet is used as a base material of an adhesive tape, there is a possibility that when heat resistance of the crosslinked polyolefin-based resin foam sheet is reduced and heat is applied, the adhesive tape is shrunk and is deviated from an application position. Therefore, −10% or more is preferable. If the rate is ton large, when the crosslinked polyolefin-based resin foam sheet is used as a base material of an adhesive tape, there is a possibility that, when heat is applied to the crosslinked polyolefin-based resin foam sheet, the adhesive tape is inflated, and is deviated from an application position. Therefore, −10 to 5% is more preferable, and −2.0 to 2.0% is particularly preferable.

A thermal dimensional change rate at 90° C. of the crosslinked polyolefin-based resin foam sheet refers to a rate measured according to JIS K6767 except that a measuring temperature is 90° C.

Then, a process for producing the crosslinked polyolefin-based resin foam sheet will be explained. The process for producing the crosslinked polyolefin-based resin foam sheet is not particularly limited, and examples thereof may include (1) a process for producing a crosslinked polyolefin-based resin foam sheet, comprising the steps of feeding a polyolefin-based resin containing 40% by weight or more of a polyethylene-based resin obtained using a metallocene compound containing a tetravalent transition metal as a polymerization catalyst, and a thermally degradable blowing agent to an extruder, melting and kneading them, and extruding the kneaded material through the extruder into a sheet to prepare an expandable polyolefin-based resin sheet; irradiating the expandable polyolefin-based resin sheet with ionizing radiation to crosslink the expandable polyolefin-based resin sheet so as to have a degree of crosslinking of 5 to 60% by weight; and heating and expanding the crosslinked expandable polyolefin-based resin sheet, and stretching the resulting foam sheet towards any one or both of directions of MD and CD while maintaining the melted state at expansion to stretch a cell of the foam sheet, thereby producing a crosslinked polyolefin-based resin foam sheet in which an aspect ratio of a cell (MD average cell diameter/CD average cell diameter) is 0.25 to 1 or an aspect ratio of a cell (CD average cell diameter/VD average cell diameter) is 2 to 18, (2) a process for producing a crosslinked polyolefin-based resin foam sheet, comprising the steps of feeding a polyolefin-based resin containing 40% by weight or more of a polyethylene-based resin obtained using a metallocene compound containing a tetravalent transition metal as a polymerization catalyst, a thermally degradable blowing agent and an organic peroxide to an extruder, melting and kneading them, and extruding the kneaded material through the extruder into a sheet to prepare an expandable polyolefin-based resin sheet; heating the expandable polyolefin-based resin sheet to decompose the organic peroxide, and expanding the expandable polyolefin-based resin sheet while crosslinking it so as to have a degree of crosslinking of 5 to 60% by weight; and stretching the resulting foam sheet towards any one or both of directions of MD and CD while maintaining the melted state at expansion to stretch a cell of the foam sheet, thereby producing a crosslinked polyolefin-based resin foam sheet in which an aspect ratio of a cell (MD average cell diameter/CD average cell diameter) is 0.25 to 1 or an aspect ratio of a cell (CD average cell diameter/VD average cell diameter) is 2 to 18, (3) a process for producing a crosslinked polyolefin-based resin foam sheet, comprising the steps of feeding a polyolefin-based resin containing 40% by weight or more of a polyethylene-based resin obtained using a metallocene compound containing a tetravalent transition metal as a polymerization catalyst, and a thermally degradable blowing agent to an extruder, melting and kneading them, and extruding the kneaded material through the extruder into a sheet to prepare an expandable polyolefin-based resin sheet; irradiating the expandable polyolefin-based resin sheet with ionizing radiation to crosslink the expandable polyolefin-based resin sheet so as to have a degree of crosslinking of 5 to 60% by weight; heating and expanding the crosslinked expandable polyolefin-based resin sheet, and cooling the sheet to prepare a foam sheet; heating again the foam sheet into a melted state or a softened state; and stretching the foam sheet towards any one or both of directions of MD and CD to stretch a cell of the foam sheet, thereby producing a crosslinked polyolefin-based resin foam sheet in which an aspect ratio of a cell (MD average cell diameter/CD average cell diameter) is 0.25 to 1 or an aspect ratio of a cell (CD average cell diameter/VD average cell diameter) is 2 to 18, (4) a process for producing a crosslinked polyolefin-based resin foam sheet, comprising the steps of feeding a polyolefin-based resin containing 40% by weight or more of a polyethylene-based resin obtained using a metallocene compound containing a tetravalent transition metal as a polymerization catalyst, a thermally degradable blowing agent and an organic peroxide to an extruder, melting and kneading them, and extruding the kneaded material through the extruder into a sheet to prepare an expandable polyolefin-based resin sheet; heating the expandable polyolefin-based resin sheet to decompose the organic peroxide, expanding the expandable polyolefin-based resin sheet while crosslinking it so as to have a degree of crosslinking of 5 to 60% by weight, and cooling the sheet to prepare a foam sheet; heading again the foam sheet into a melted state or a softened state; and stretching the foam sheet towards any one or both of directions of MD and CD to stretch a cell of the foam sheet, thereby producing a crosslinked polyolefin-based resin foam sheet in which an aspect ratio of a cell (MD average cell diameter/CD average cell diameter) is 0.25 to 1 or an aspect ratio of a cell (CD average cell diameter/VD average cell diameter) is 2 to 18, and the like.

The thermally degradable blowing agent is not particularly limited as far as it has been conventionally used for preparing a foam, and examples thereof may include azodicarbonamide, N,N'-dinitrosopentamethylenetetramine, p-toluenesulfonylsemicarbazide and the like. Among these, azodicarbonamide is preferable. The thermally degradable blowing agents may be used alone, or two or more of them may be used in combination.

An amount of the thermally degradable blowing agent to be added in the expandable polyolefin-based resin composition may be appropriately determined depending on an expansion ratio of the crosslinked polyolefin-based resin foam sheet. If the amount is small, expandability of the expandable polyolefin-based resin sheet is reduced, and the crosslinked polyolefin-based resin foam sheet having a desired expansion ratio can not be obtained in some cases. On the other hand, if the amount is large, a tensile strength and compression recovering property of the resulting crosslinked polyolefin-based resin foam sheet are reduced in some cases. Therefore, the amount is preferably 1 to 40 parts by weight, more preferably 1 to 30 parts by weight with respect to 100 parts by weight of a polyolefin-based resin.

If necessary, an antioxidant such as 2,6-di-t-butyl-p-cresol, an expansion aid such zinc oxide, a cell nucleus adjusting agent, a thermal stabilizer, a coloring agent, a flame-retardant, an anti-static agent, a filler and the like may be added to the expandable polyolefin-based resin composition in such a range that physical properties of the crosslinked polyolefin-based resin foam sheet are not deteriorated.

Examples of a method of crosslinking the expandable polyolefin-based resin sheet may include a method of irradiating an expandable polyolefin-based resin sheet with ionizing radiation such as electron beam, α-ray, β-ray and γ-ray, a method of blending an organic peroxide in an expandable polyolefin-based resin composition in advance, and heating the resulting expandable polyolefin-based resin sheet to decompose the organic peroxide, and the like. These methods may be used in combination.

Examples of the organic peroxide may include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumylperoxy neodecanate, t-butylperoxy benzoate, 2,5-dimethyl-2,5-di(benzoylperoxy)hexane, t-butylperoxy isopropylcarbonate, t-butylperoxy allylcarbonate and the like. These may be used alone, or two or more of them may be used in combination.

If an amount of the organic peroxide to be added is small, crosslinking of the expandable polyolefin-based resin sheet becomes insufficient in some cases. On the other hand, if the amount is large, a degradation residue of the organic peroxide remains in the resulting crosslinked polyolefin-based resin foam sheet in some cases. Therefore, the amount is preferably 0.01 to 5 parts by weight, more preferably 0.1 to 3 parts by weight, per 100 parts by weight a polyolefin-based resin.

In addition, a method of expanding the expandable polyolefin-based resin sheet is not particularly limited, and examples thereof may include a method of heating by a hot air, a method of heating by infrared-ray, a method by a salt bath, a method by an oil bath, and the like. These may be used in combination.

Stretching of the foam sheet may be performed after the expandable polyolefin-based resin sheet is expanded to obtain a foam sheet, or may be performed while the expandable polyolefin-based resin sheet is expanded. When the expandable polyolefin-based resin sheet is expanded to obtain a foam sheet, and the foam sheet is stretched, the foam sheet may be stretched while the melted state at expansion is maintained without cooling the foam sheet, or the foam sheet is cooled, the foam sheet is heated again into a melted state or a softened state, thereafter, the foam sheet may be stretched.

The melted state of the foam sheet refers to a state where the foam sheet is heated so that a temperature of both sides thereof becomes a melting point or more of a polyolefin-based resin constituting the foam sheet. A melting point (° C.) of the polyolefin-based resin refers to a maximum peak temperature among endothermic peaks accompanied with melting of a crystal obtained when calorimetric analysis is performed by differential scanning calorimetry (DSC).

In addition, the softened sheet of the foam sheet refers to a state where the foam sheet is heated to a temperature so that a temperature T (° C.) of both sides thereof satisfies the following equation. A softening point (° C.) of the polyolefin-based resin refers to a vicat softening point measured based on ASTM D1525.

Softening point of polyolefin-based resin −10° C.≤T≤softening point of polyolefin-based resin+10° C.

By stretching the foam sheet, a cell of the foam sheet is stretched and deformed in a predetermined direction, so that a crosslinked polyolefin-based resin foam sheet having an aspect ratio of a cell within a predetermined range can be produced.

Further, regarding a stretching direction of the foam sheet, the sheet is stretched towards MD or CD, or towards MD and CD of a continuous expandable polyolefin-based resin. When the expandable polyolefin-based resin sheet is stretched towards MD and CD, the foam sheet may be stretched simultaneously towards MD and CD, or may be stretched separately every one direction.

Examples of a method of stretching the foam sheet in MD may include a method of stretching the foam sheet in MD by rendering a speed of winding (winding speed) a continuous foam sheet while cooling after expansion faster than a speed of feeding (feeding speed) a continuous expandable polyolefin-based resin sheet to an expanding step, a method of stretching the foam sheet in MD by rendering a speed of winding (winding speed) the foam sheet faster than a speed of feeding (feeding speed) the resulting foam sheet to a stretching step, and the like.

In the former method, since the expandable polyolefin-based resin sheet is inflated in MD by expansion of itself, when the foam sheet is stretched in MD, an inflated portion in MD of the expandable polyolefin-based resin sheet by expansion is taken into consideration, and it is necessary to adjust a rate of feeding the sheet and a rate of winding the sheet so that the foam sheet is stretched in MD more than that inflated portion.

As a method of stretching the foam sheet in CD, a method of grasping both ends of CD of the foam sheet with a pair of grasping members, and stretching the foam sheet in CD by moving gradually the pair of grasping members in such a direction that members are apart is preferable. Since the expandable polyolefin-based resin sheet is inflated in CD by expansion of itself, when the foam sheet is stretched in CD, an inflated portion in CD of the expandable polyolefin-based resin sheet by expansion is taken into consideration, and it is necessary to adjust so that the foam sheet is stretched in CD more than that inflated portion.

Herein, if a stretching ratio in MD of the crosslinked polyolefin-based resin foam sheet is small, flexibility and a tensile strength of the crosslinked polyolefin-based resin foam sheet are reduced in some cases. On the other hand, if the rate is large, the foam sheet is cut during stretching, or an expanding gas is escaped from the foam sheet during expansion, an expansion ratio of the resulting crosslinked polyolefin-based resin foam sheet is remarkably reduced, flexibility and a tensile strength of the crosslinked polyolefin-based resin foam sheet are reduced, or quality becomes uneven in some cases. Therefore, the ratio is preferably 1.1 to 2.0 times, more preferably 1.2 to 1.5 times.

A stretching ratio in MD of the crosslinked polyolefin-based resin foam sheet is calculated by the following manner. That is, a cubic root F of an expansion ratio of the crosslinked polyolefin-based resin foam sheet is obtained, and a ratio of a winding speed and a feeding speed (winding speed/feeding speed) V is obtained, so that a stretching ratio in MD of the crosslinked polyolefin-based resin foam sheet can be calculated based on the following equation. However, an expansion ratio of the crosslinked polyolefin-based resin foam sheet refers to a specific gravity of the expandable polyolefin-based resin sheet divided by a specific gravity of the crosslinked polyolefin-based resin foam sheet.

Stretching rate(times)in MD of a foam sheet=$V/F$

If a stretching ratio in CD of the crosslinked polyolefin-based resin foam sheet is small, flexibility and a tensile strength of the crosslinked polyolefin-based resin foam sheet are reduced. On the other hand, if the stretching ratio is large, the foam sheet is cut during stretching, or an expansion gas is escaped from the foam sheet during expansion, an expansion ratio of the resulting crosslinked polyolefin-based resin foam sheet is remarkably reduced, flexibility and a tensile strength of the crosslinked polyolefin-based resin foam sheet are reduced, or quality becomes uneven. Therefore, the ratio is preferably 1.2 to 4.5 times, more preferably 1.5 to 3.5 times.

A stretching ratio in CD in the crosslinked polyolefin-based resin foam sheet can be calculated based on the following equation when a length in CD of a crosslinked polyolefin-based resin foam sheet obtained by heating and expanding the expandable polyolefin-based resin sheet without stretching in its MD and CD is $W_1$, and a length in CD of the crosslinked polyolefin-based resin foam sheet stretched in CD is $W_2$.

Stretching rate(times)in CD of foam sheet=$W_2/W_1$

Utility of the resulting crosslinked polyolefin-base resin foam sheet is not particularly limited, and the sheet is used as an adhesive tape by layering and integrating an adhesive layer on and with at least one side of the crosslinked polyolefin-based resin foam sheet, or is used as a medical patch by applying a medicament on one side of the crosslinked polyolefin-based resin foam sheet.

More specifically, an adhesive tape formed by using the crosslinked polyolefin-based resin foam sheet as a base material is used as an adhesive tape for absorbing irregularities of an irregular plane, or is used as an electronic appliance sealing material for preventing application of impact on an electronic part mounted in an electronic appliance main body such as a mobile phone and a video camera, and preventing entrance of a dust into the electronic appliance main body. In particular, since a thickness of the crosslinked polyolefin-based resin foam sheet can be reduced while retaining excellent flexibility and heat resistance, it can be suitably used in utility of an electronic appliance which has been remarkably miniaturized.

When the crosslinked polyolefin-based resin foam sheet is used as a base material of an adhesive tape, if the thickness of a crosslinked polyolefin-based resin foam sheet is small, flexibility and a tensile strength of a crosslinked polyolefin-based resin foam sheet are reduced, and texture and a mechanical strength of the resulting adhesive tape are reduced. On the other hand, even if the thickness is large, improvement in performance of an adhesive tape can not be predicted, and economical property is deteriorated. Therefore, the thickness is preferably 0.05 to 2 mm, more preferably 0.1 to 8 mm.

In addition, an adhesive constituting an adhesive layer which is layered on and integrated with one side or both sides of the crosslinked polyolefin-based resin foam sheet is not particularly limited as far as it has been conventionally used in an adhesive tape, and examples thereof may include an acrylic-based adhesive, a urethane-based adhesive, a rubber-based adhesive and the like.

Further, examples of a method of layering and integrating an adhesive layer on and with the crosslinked polyolefin-based resin foam sheet by applying the adhesive on at least one side of the crosslinked polyolefin-based resin foam sheet may include a method of applying an adhesive onto at least one side of a crosslinked polyolefin-based resin foam sheet using a coating machine such as a coater, a method of spraying and applying an adhesive onto at least one side of a crosslinked polyolefin-based resin foam sheet using a spray, a method of applying an adhesive onto at least one side of a crosslinked polyolefin-based resin foam sheet using a brush, and the like.

Effects of the Invention

The crosslinked polyolefin-based resin foam sheet of the present invention is a crosslinked polyolefin-based resin foam sheet obtained by feeding a polyolefin-based resin and a thermally degradable blowing agent to an extruder, melting and kneading them, and extruding the kneaded material through the extruder into a sheet to form an expandable polyolefin-based resin sheet, and expanding the sheet, wherein a degree of crosslinking of the crosslinked polyolefin-based resin foam sheet is 5 to 60% by weight, an aspect ratio of a cell is within a predetermined range, and the polyolefin-based resin contains 40% by weight or more of a polyethylene-based resin obtained using a metallocene compound containing a tetravalent transition metal as a polymerization catalyst. Therefore, a thickness of the sheet can be reduced while maintaining excellent flexibility and heat resistance.

In addition, when a 25% compression strength according to JIS K6767 is $4.9 \times 10^4$ Pa or less, a tensile strength at 23° C. in at least one direction of MD and CD is $1.96 \times 10^6$ Pa or more, and a thermal dimensional change rate at 90° C. is −10% or more in the crosslinked polyolefin-based resin foam sheet, touch feeding, impact absorbing property and heat resistance are further excellent.

Further, since an adhesive tape in which an adhesive layer is layered on and integrated with one side of the crosslinked polyolefin-based resin foam sheet having a thickness of 0.05 to 2 mm is excellent property of absorbing irregularities of an irregular plane and, also, can reduce a thickness while retaining excellent flexibility and impact resistance, the tape can be also suitably used as a sealing material for protecting parts of a small electronic appliance.

A polyolefin-based resin constituting the crosslinked polyolefin-based resin foam sheet of the present invention contains 40% by weight or more of a polyethylene-based resin obtained using a metallocene compound containing a tetravalent transition metal as a polymerization catalyst.

Although the polyethylene-based resin obtained using a metallocene compound is flexible, the resin has little adherability; therefore, the polyolefin-based resin containing 40% by weight or more of this polyethylene-based resin exhibits little adherability in its melted state.

Therefore, when a crosslinked polyolefin-based resin foam sheet is produced by stretching a foam sheet obtained by expanding the polyolefin-based resin containing 40% by weight or more of a polyethylene-based resin obtained using a metallocene compound containing a tetravalent transition metal as a polymerization catalyst, even if cell walls of the foam sheet are in the closed state, situation where cell walls are adhered to and integrated with one another can be generally prevented; therefore, a crosslinked polyolefin-based resin foam sheet having an aspect ratio of a cell within a desired range can be obtained simply.

In addition, the polyethylene-based resin obtained using a metallocene compound has a narrow molecular weight distribution and, in the case of a copolymer, a copolymer component is introduced in any molecular weight component at an appropriately equal ratio, and an expandable polyolefin-based resin sheet can be generally crosslinked evenly.

Therefore, when a crosslinked polyolefin-based resin foam sheet is produced by stretching a foam sheet, the foam sheet can be totally evenly stretched, and the resulting crosslinked polyolefin-based resin foam sheet has a generally even thickness and, at the same time, an aspect ratio of a cell is totally even, and quality such as mechanical strength and flexibility is totally even.

BRIEF DESCRIPTION OF THE DRAWING

FIG. 1 is a schematic view showing MD, CD and VD of a crosslinked polyolefin-based resin foam sheet.

EXPLANATION OF SYMBOLS

1: crosslinked polyolefin-based resin foam sheet.

BEST MODE FOR CARRYING OUT THE INVENTION

Examples 1 to 4, Comparative Example 4

An expandable polyolefin-based resin composition consisting of 100 parts by weight of linear low density polyethylene (made by Exxon Chemical Company, trade name: "EXACT3027", density: 0.900 g/cm$^3$, weight-average molecular weight: 2.0, melting point: 98° C., softening point: 85° C.) obtained using a metallocene compound containing a tetravalent transition metal as a polymerization catalyst, 5 parts by weight of azodicarbonamide, 0.3 part by weight of 2,6-di-t-butyl-p-cresol and 1 part by weight of zinc oxide was fed to an extruder, melted and kneaded at 130° C., and extruded into a continuous expandable polyolefin-based resin sheet having a width of 200 mm and a thickness of 0.8 mm.

Then, both sides of the continuous expandable polyolefin-based resin foam sheet were irradiated with an electron beam of an acceleration voltage of 800 kV at 5 Mrad to crosslink the expandable polyolefin-based resin sheet, and this expandable polyolefin-based resin sheet was continuously sent into an expanding furnace retained at 250° C. with a hot air and an infrared heater, followed by heating and expansion.

Thereafter, after the resulting foam sheet was continuously sent out from the expanding furnace, this foam sheet was stretched in its CD in the state where a temperature of both sides of the foam sheet was maintained at 200 to 250° C. and, at the same time, the foam sheet was wound at a winding speed faster than a speed of sending the expandable polyolefin-based resin sheet into the expansion furnace (feeding speed), thereby, the foam sheet was stretched in MD to stretch and deform a cell of the foam sheet in CD and MD, to obtain a crosslinked polyolefin-based resin foam sheet having a width, a thickness, a degree of crosslinking and an expansion ratio shown in Table 1. The winding speed of the foam sheet was adjusted while an inflation portion in MD by expansion of the expandable polyolefin-based resin sheet itself was taken into consideration. In addition, a ratio of the winding speed and the feeding speed of the foam sheet (winding speed/feeding speed), as well as a stretching ratio of MD and CD of the crosslinked polyolefin-based resin foam sheet are shown in Table 1.

In Comparative Example 4, since a stretching ratio of MD and CD of the foam sheet was too great, an expansion gas was escaped, and an expansion ratio of the resulting crosslinked polyolefin-based resin foam sheet results in a low level of 5.2 times.

Example 5

According to the same procedure as that of Example 1 except that an amount of azodicarbonamide to be added was 3 parts by weight in place of 5 parts by weight, extrusion was performed so that a thickness of the expandable polyolefin-based resin sheet was 0.32 mm, and a ratio of a feeding speed and a winding speed (feeding rate/winding rate) of the foam sheet, as well as a width of CD in the crosslinked polyolefin-based resin foam sheet was 1050 mm, a crosslinked polyolefin-based resin foam sheet was obtained.

Example 6

An expandable polyolefin-based resin composition consisting of 100 parts by weight of linear low density polyethylene (made by Exxon Chemical Company, trade name: "EXACT3027", density: 0.900 g/cm$^3$, weight-average molecular weight: 2.0, melting point: 98° C., softening point: 85° C.) obtained using a metallocene compound containing a tetravalent transition metal as a polymerization catalyst, 5 parts by weight of azodicarbonamide, 0.3 part by weight of 2,6-di-t-butyl-p-cresol and 1 part by weight of zinc oxide was fed to an extruder, and melted and kneaded it at 130° C., which was extruded into a continuous expandable polyolefin-based resin sheet having a width of 200 mm and a thickness of 0.8 mm.

Then, both sides of the continuous expandable polyolefin-based resin sheet were irradiated with an electron beam of an acceleration voltage of 800 kV at 5 Mrad to crosslink the expandable polyolefin-based resin sheet, this expandable polyolefin-based resin sheet was continuously sent into an expansion furnace retained at 250° C. by a hot air and an infrared heater, was heated and expanded, and was cooled to prepare a continuous foam sheet, which was wound in a coil.

The resulting foam sheet was successively fed to a stretching step, the foam sheet was heated so that a temperature of its both sides became 110° C., the foam sheet was stretched in its CD and, at the same time, the foam sheet was stretched in MD by winding the foam sheet at a winding speed faster than a feeding speed of the foam sheet, to stretch and deform a cell of the foam sheet in CD and MD to obtain a crosslinked polyolefin-based resin foam sheet having a width, a thickness, a degree of crosslinking and an expansion ratio shown in Table 1. In addition, a ratio of a winding speed and a feeding speed of the foam sheet (winding speed/feeding speed), as well as a stretching ratio of MD and CD of the crosslinked polyolefin-based resin foam sheet are shown in Table 1.

Comparative Example 1

According to the same procedure as that of Example 1 except that the foam sheet was not stretched in CD, a crosslinked polyolefin-based resin foam sheet was obtained.

Comparative Example 2

According to the same procedure as that of Example 1 except that a width of CD of the foam sheet became 2000 mm, a crosslinked polyolefin-based resin foam sheet was tried to be prepared, but the foam sheet was cut in CD, and a crosslinked polyolefin-based resin foam sheet could not be obtained.

Comparative Example 3

According to the same procedure as that of Example 2 except that a polyolefin-based resin consisting of 20 parts by weight of linear low density polyethylene (made by Exxon Chemical Company, trade name: "EXACT3027", density: 0.900 g/cm³, weight-average molecular weight: 2.0) obtained using a metallocene compound containing a tetravalent transition metal as a polymerization catalyst, and 80 parts by weight of a polyethylene resin (density: 0.923 g/cm³) was used in place of 100 parts by weight of linear low density polyethylene (made by Exxon Chemical Company, trade name: "EXACT3027", density: 0.900 g/cm³, weight-average molecular weight: 2.0) obtained using a metallocene compound containing a tetravalent transition metal as a polymerization catalyst, a crosslinked polyolefin-based resin foam sheet was tried to be prepared, but the foam sheet was cut in CD in a step of stretching the foam sheet, and a crosslinked polyolefin-based resin foam sheet could not be obtained.

Comparative Example 5

According to the same procedure as that of Example 1 except that a polyolefin-based resin consisting of 20 parts by weight of linear low density polyethylene (made by Exxon Chemical Company, trade name: "EXACT3027", density: 0.900 g/cm³, weight-average molecular weight: 2.0) obtained using a metallocene compound containing a tetravalent transition metal as a polymerization catalyst and 80 parts by weight of an ethylene-vinyl acetate copolymer (ethylene content: 18% by weight) was used in place of 100 parts by weight of linear low density polyethylene (made by Exxon Chemical Company, trade name: "EXACT3027", density: 0.900 g/cm³, weight-average molecular weight: 2.0) obtained using a metallocene compound containing a tetravalent transition metal as a polymerization catalyst, a crosslinked polyolefin-based resin foam sheet was prepared.

Average cell diameters of MD, CD and VD in the resulting crosslinked polyolefin-based resin foam sheet, an aspect ratio of a cell (MD average cell diameter/CD average cell diameter) (expressed as "MD/CD" in Table 1) and an aspect ratio of a cell (CD average cell diameter/VD average cell diameter) (expressed as "CD/VD" in Table 1), a 25% compression strength according to JIS K6767, tensile strengths at 23° C. in MD and CD, as well as a thermal dimensional change rate in MD at 90° C. are shown in Table 1.

TABLE 1

| | | Example 1 | Example 2 | Example 3 | Example 4 | Example 5 | Example 6 |
|---|---|---|---|---|---|---|---|
| Winding speed/feeding speed | | 2.50 | 2.50 | 3.10 | 4.30 | 2.15 | 2.50 |
| Stretching ratio (times) | MD | 1.2 | 1.2 | 1.4 | 2.0 | 1.3 | 1.2 |
| | CD | 2.0 | 3.0 | 1.4 | 1.5 | 2.4 | 2.0 |
| Average cell diameter (μm) | MD | 112 | 110 | 145 | 200 | 165 | 115 |
| | CD | 210 | 330 | 142 | 150 | 370 | 218 |
| | VD | 38 | 24 | 44 | 30 | 28 | 36 |
| Aspect ratio | MD/CD | 0.53 | 0.33 | 1.02 | 1.33 | 0.45 | 0.53 |
| | CD/VD | 5.53 | 13.75 | 3.23 | 5.00 | 13.21 | 6.06 |
| Width (mm) | | 860 | 1300 | 600 | 640 | 1050 | 860 |
| Thickness (mm) | | 0.6 | 0.4 | 0.75 | 0.5 | 0.1 | 0.6 |
| Degree of crosslinking (wt %) | | 25 | 25 | 25 | 25 | 25 | 25 |
| Expansion ratio (times) | | 9.8 | 9.6 | 9.9 | 9.6 | 4.7 | 9.9 |
| 25% compression strength (×10⁴ Pa) | | 3.92 | 2.94 | 4.90 | 3.92 | 2.94 | 3.88 |
| Tension strength (×10⁶ Pa) | MD | 3.03 | 2.94 | 3.92 | 4.41 | 6.88 | 2.98 |
| | CD | 2.94 | 3.92 | 2.45 | 2.50 | 6.96 | 2.90 |
| Thermal dimensional change rate (%) | MD | −2.0 | −0.5 | −3.0 | −3.5 | −3.7 | −2.0 |
| | CD | −5.0 | −8.0 | −3.0 | −3.5 | −9.5 | −7.0 |

TABLE 1-continued

|  |  | Comparative Example 1 | Comparative Example 2 | Comparative Example 3 | Comparative Example 4 | Comparative Example 5 |
|---|---|---|---|---|---|---|
| Winding speed/feeding speed | | 2.50 | 2.50 | 2.50 | 4.10 | 2.50 |
| Stretching ratio (times) | MD | 1.2 | 1.2 | 1.2 | 2.4 | 1.2 |
| | CD | 1.0 | — | — | 5.8 | 2.0 |
| Average cell diameter (μm) | MD | 115 | — | — | 190 | 305 |
| | CD | 100 | — | — | 310 | 300 |
| | VD | 78 | — | — | 15 | 48 |
| Aspect ratio | MD/CD | 1.15 | — | — | 0.61 | 1.02 |
| | CD/VD | 1.28 | — | — | 20.67 | 6.25 |
| Width (mm) | | 430 | — | — | 1300 | 860 |
| Thickness (mm) | | 1.2 | — | — | 0.25 | 0.6 |
| Degree of crosslinking (wt %) | | 25 | — | — | 25 | 25 |
| Expansion ratio (times) | | 10.0 | — | — | 5.2 | 9.9 |
| 25% compression strength ($\times 10^4$ Pa) | | 9.80 | — | — | 5.88 | 2.94 |
| Tension strength ($\times 10^6$ Pa) | MD | 2.99 | — | — | 5.88 | 1.27 |
| | CD | 2.06 | — | — | 4.90 | 0.69 |
| Thermal dimensional change rate (%) | MD | −3.0 | — | — | −6.0 | −20 |
| | CD | −1.0 | — | — | −8.0 | −40 |

INDUSTRIAL APPLICABILITY

The crosslinked polyolefin-based resin foam sheet of the present invention is suitable for using as an adhesive tape wherein an adhesive layer is layered on and integrated with at least one side of the crosslinked polyolefin-based resin foam sheet, or using as a medical patch wherein a medicament is applied on one side of the crosslinked polyolefin-based resin foam sheet.

The invention claimed is:

1. An electronic appliance comprising:
an electronic appliance main body,
an electronic part mounted in the electronic appliance main body, and
an adhesive tape which prevents application of impact on the electronic part and prevents entrance of dust into the electronic appliance main body,
wherein the adhesive tape comprises:
a crosslinked polyolefin-based resin foam sheet, and
an adhesive layer that is layered on and integrated with at least one side of the crosslinked polyolefin-based resin foam sheet,
wherein the crosslinked polyolefin-based resin foam sheet is obtained by feeding a polyolefin-based resin and a thermally degradable blowing agent into an extruder, melting and kneading the polyolefin-based resin and the thermally degradable blowing agent, extruding the kneaded material through the extruder into a sheet to form an expandable polyolefin-based resin sheet, expanding the sheet to form the crosslinked polyolefin-based resin foam sheet, and stretching the crosslinked polyolefin-based resin foam sheet in a melted state after the expansion of the sheet to obtain a thickness of 0.05 to 2 mm,
wherein the crosslinked polyolefin-based resin foam sheet comprises the polyolefin-based resin,
wherein the polyolefin-based resin consists of a polyethylene-based resin obtained using a metallocene compound containing a tetravalent transition metal as a polymerization catalyst,
wherein the crosslinked polyolefin-based resin foam sheet has a degree of crosslinking of the crosslinked polyolefin-based resin foam sheet of 10 to 60% by weight, a first aspect ratio of a cell (MD average cell diameter/CD average cell diameter) of 0.25 to 0.60, and a second aspect ratio of a cell (CD average cell diameter/VD average cell diameter) of 2.5 to 15,
wherein the expandable polyolefin-based resin sheet is continuous and the crosslinked polyolefin-based resin foam sheet is continuous, and
wherein the crosslinked polyolefin-based resin foam sheet is stretched towards both of directions of MD and CD.

2. The electronic appliance according to claim 1, wherein the crosslinked polyolefin-based resin foam sheet comprises 40% by weight or more of the polyolefin-based resin.

3. The electronic appliance according to claim 1, wherein the crosslinked polyolefin-based resin foam sheet has a stretching ratio in CD of 1.2 to 4.5 times.

* * * * *